United States Patent
Erb (10) Patent No.: US 10,805,162 B2
(45) Date of Patent: Oct. 13, 2020

(54) CONTENT POLICY DISCOVERY

(71) Applicant: NETSWEEPER (BARBADOS) INC., St. Michael (BB)

(72) Inventor: Jeremy Erb, Breslau (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 71 days.

(21) Appl. No.: 15/758,989

(22) PCT Filed: Sep. 8, 2016

(86) PCT No.: PCT/IB2016/055363
§ 371 (c)(1),
(2) Date: Mar. 9, 2018

(87) PCT Pub. No.: WO2017/042713
PCT Pub. Date: Mar. 16, 2017

(65) Prior Publication Data
US 2018/0198683 A1    Jul. 12, 2018

Related U.S. Application Data

(60) Provisional application No. 62/216,880, filed on Sep. 10, 2015.

(51) Int. Cl.
*H04L 12/24* (2006.01)
*H04L 29/06* (2006.01)

(52) U.S. Cl.
CPC ........ *H04L 41/0893* (2013.01); *H04L 63/105* (2013.01); *H04L 63/205* (2013.01)

(58) Field of Classification Search
CPC .. H04L 41/0893; H04L 63/205; H04L 63/105
See application file for complete search history.

(56) References Cited

U.S. PATENT DOCUMENTS

| 8,825,799 | B2 | 9/2014 | Shuster |
| 8,826,443 | B1 | 9/2014 | Raman et al. |

(Continued)

FOREIGN PATENT DOCUMENTS

| CA | 2880632 A1 | 2/2014 |
| CA | 2889632 A1 | 11/2015 |
| EP | 2178009 A1 | 4/2010 |

OTHER PUBLICATIONS

EPO, Extended European Search Report, dated Jun. 19, 2019, re European Patent Application No. 16843777.0.

(Continued)

*Primary Examiner* — Michael A Keller
(74) *Attorney, Agent, or Firm* — Perry + Currier Inc.

(57) ABSTRACT

A remote client terminal sends a request for a resource controlled by a host. The host responds by providing a reference to a policy discovery script. The policy discovery script controls the client terminal to make a test resource request to a policy service domain. A policy service executes a policy decision for the test resource request in accordance with any policy existent for the remote client terminal. The policy service transmits an indication of any deny decision to the remote client terminal. The policy discovery script processes the indication of the deny decision to output an indication of policy existent for the remote client terminal. The indication of existent policy can be outputted to the host, to a user agent at the client terminal, or to the user, so as to facilitate content modification or replacement or to inform the user of the policy.

16 Claims, 8 Drawing Sheets

(56) References Cited

U.S. PATENT DOCUMENTS

| | | |
|---|---|---|
| 2007/0011731 A1 | 1/2007 | Le et al. |
| 2007/0033636 A1 | 2/2007 | Buckley et al. |
| 2008/0033822 A1 | 2/2008 | Merdinger |
| 2009/0222575 A1 | 9/2009 | Goodman |
| 2009/0320094 A1 | 12/2009 | Kiss |
| 2015/0128212 A1 | 5/2015 | Scott et al. |

OTHER PUBLICATIONS

WIPO, International Preliminary Report on Patentability, dated Mar. 13, 2018, re PCT Patent Application No. PCT/132016/055363.
International Search Report dated Nov. 3, 2016 for PCT Patent Application No. PCT/132016/055363.
Written Opinion of the Internatioanl Searching Authority dated Nov. 3, 2016 for PCT Patent Applicaton No. PCT/1B2016/055363.

CONTENT POLICY DISCOVERY

CROSS-REFERENCE TO RELATED APPLICATIONS

This application claims priority to U.S. App. Ser. No. 62/216,880, filed Sep. 10, 2015, and incorporated herein by reference.

FIELD

This disclosure relates to computer data and communications systems.

BACKGROUND

Content policy services are known to restrict or otherwise control access by clients to content. For example, a policy service may restrict access to the Internet by terminals installed at a school. Sites that are not educational and potentially harmful may be blocked. Other types of users may also be subject to content policy by other organizations.

In some instances, when a request for content violates policy, a user is served a block page with little or no suggestion as to why the content was blocked or what to do next. The user may be unaware of content policy until the user attempts to access restricted content. A complete picture of the content policy that applies to the user is unavailable via block pages alone. In other instances, entire hosts or sites may be blocked when only a subset of the content at the host or site violates policy. In still other instances, links to blocked content are presented to the user among links to allowed content and policy is not executed until the user clicks a link, resulting in an apparently allowed link leading directly to a block page. These examples of problems with current systems are at least partially due to the nature of the World Wide Web and page hyperlinking. In addition to a poor user experience, these problems may also result in excessive processing of needless policy decisions and excessive communications for needless requests for content that will go unfulfilled, thereby wasting resources of the computer systems involved.

These and other drawbacks of state-of-the-art systems will be addressed by this disclosure.

SUMMARY

The systems and processes described herein enable a client terminal to discover any content policy that may be enforced against its requests for resources available on a computer network. For example, the client terminal may be a computer or similar device connected to the Internet, and the Internet-service provider (ISP) or other network operator providing the terminal with access to the Internet may filter, limit, or otherwise restrict the terminal's access to resources on the Internet. Restricting access in this way may be done on the basis of the client terminal, a user operating the client terminal, the network to which the terminal belongs, the country or region in which the terminal is geographically located, or any other methodology. Content policy that restricts access may be enforced without knowledge of the user at the client terminal. The present invention allows the client terminal to discover information regarding content policy and to perform various actions based on this information, including notifying the user as to how their access is being restricted, notifying a host of the same, and displaying content based on discovered policy.

BRIEF DESCRIPTION OF THE DRAWINGS

The drawings illustrate, by way of example only, embodiments of the present disclosure.

DETAILED DESCRIPTION

Figure 1:
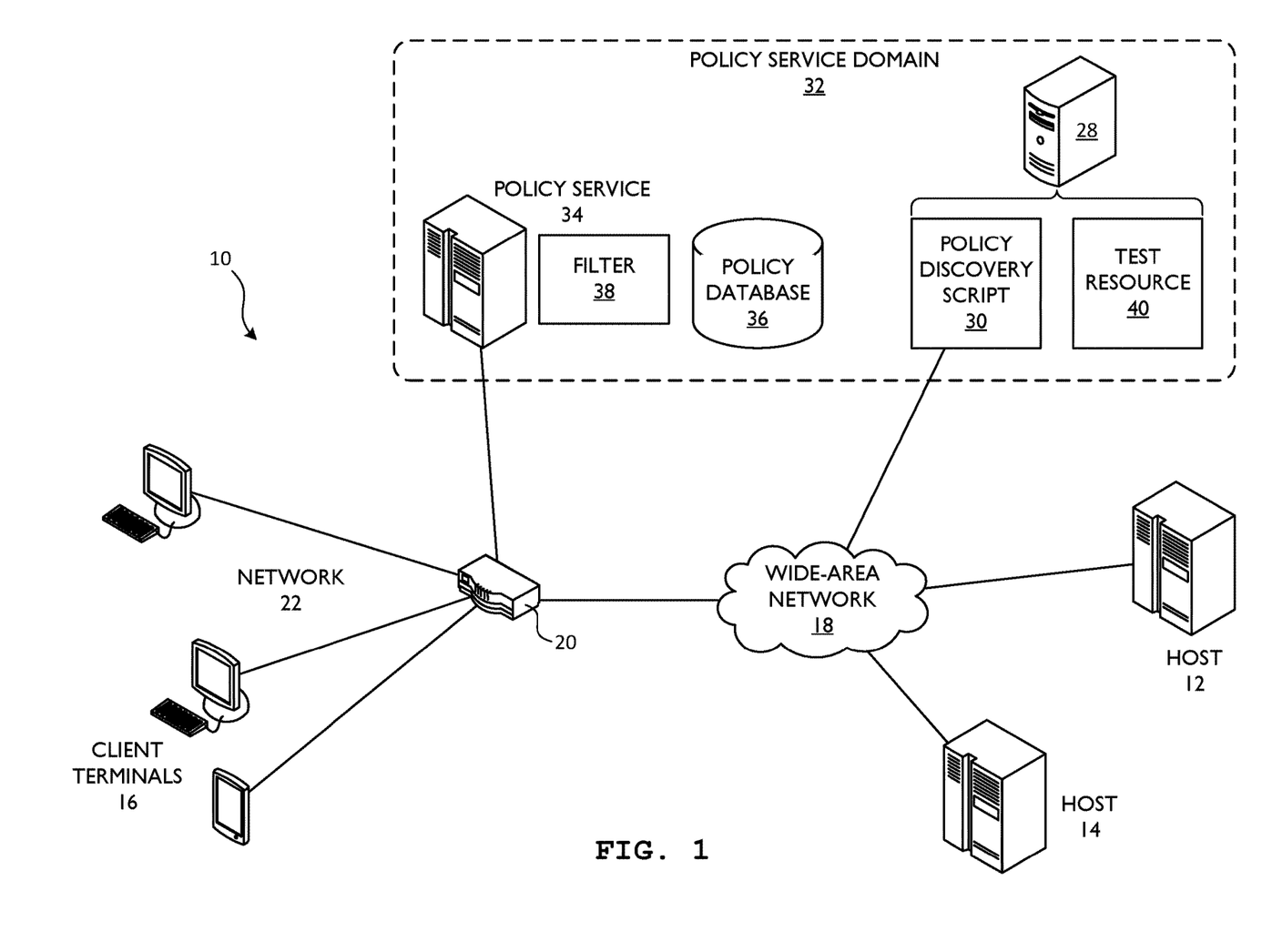
FIG. 1 is a diagram of a system that allows discovery of content policy applicable to client terminals.

FIG. 1 shows a system 10 that allows discovery of content policy applicable to client terminals, such as computers, smart phones, tablet computers, and similar types of devices. Hosts 12, 14 control resources and make such resources available to remote client terminals 16 via a wide-area network 18. Each hosts 12, 14 may include one or more computer servers and is not particularly limited. Client terminals 16 are connected to the wide-area network 18 via network infrastructure 20, such as one or more routers, switches, firewalls, other components, or a combination of such. Client terminals 16 operate on a network 22 defined by this infrastructure. The network 22 may be of any size and may be operated by any entity (e.g., enterprise, school system, household, country, commercial ISP, etc.). Any number of such networks 22 can be accommodated by the present invention.

Client terminals 16 may request resources from the hosts 12, 14 and each host 12, 14 is configured to provide responses to requests for resources. One or more of the hosts 12 may include in responses to requests a reference to a client-executable policy discovery script 30. Resources can include web pages, media, files, streams, and other content that contains hypertext markup language (HTML) code or is wrapped in HTML code. An example reference to the policy discovery script 30 includes an HTML script tag having a source attribute specifying the external location of the policy discovery script 30, for example:

<script src="http://example.com/policy_discovery_script.js>

In the example illustrated, host 12 is configured to include such a reference to the policy discovery script 30, while host 14 is not configured in this way and operates conventionally.

The policy discovery script 30 is hosted in a policy service domain 32 and is accessible to the client terminals 16 via the wide-area network 18. The policy discovery script 30 may be stored at a host 28 specifically configured to serve the policy discovery script 30 and related resources. The policy discovery script 30 can be written in any suitable language, such as JavaScript.

A policy service 34 in the policy service domain 32 is configured to execute policy decisions for any requests for resources available on the wide-area network 18 made by the client terminals 16. The policy service 34 makes a policy decision for each request and either allows or denies the request. Each policy decision is made in accordance with any policy existent at the policy service 34 for the remote client terminal that sent the resource request. A policy decision that is an allow decision results in the requested resource being delivered to the requesting client terminal 16. A policy decision that is a deny decision may result in an indication of denial, such as a block page, being displayed at the requesting terminal 16. The policy service 34 includes a policy database 36 that stores content policy and a filter 38 that executes policy decisions based on the content policy.

The host 28 of the policy discovery script 30 and related resources may be part of the policy service 34.

Content policy can be based on factors such as individual user identity (e.g., the person's identity obtained by authentication via a client terminal), a user group to which a user belongs (e.g., students, teachers, school administrators, etc.), user demographic data (e.g., age), client terminal identity (e.g., Internet protocol or IP address, media access control or MAC address, computers located in a public library's domain, etc.), content category (e.g., pornography, gambling, malware, illegal content, etc.), and the like. Resources available via the wide-area network 18 can be subject to content policy stored in the policy database 36 based on any one or combination of factors. For example, a particular web page can have its particular uniform resource locator (URL) stored in the policy database 36 with the category pornography. A user group for students can also be stored in the policy database 36 with an indication that anything in the category pornography is to be denied. In another example, users not of age of majority and within a certain region, as determined by authenticating the user to an account stored for the user, have certain content blocked. In yet another example, all terminals on a network in a specific facility are denied content that is categorized as malware.

The policy discovery script 30 is configured to control the remote client terminal 16 executing the script 30 to make one or several test resource requests for one or more test resources 40 located in the policy service domain 32. The test resources 40 may be stored at the same host 28 as the policy discovery script 30. The policy discovery script 30 is also configured to process deny decisions made by the policy service 34 in response to the test resource requests. Processing the deny decisions includes outputting any indication of policy existent for the remote client terminal 16 making the test resource request.

The policy service 34 processes test resource requests in the same way as other requests made for resources available via the wide-area network 18. However, each test resource 40 is specifically configured to trigger a deny decision. This can include identifying the test resource 40 in the policy database as content that should be denied. Each test resource 40 may be associated with one or more content policy factors, discussed above, so that a client terminal 16 that is denied requests based on one or more particular content policy factors is also denied a request for the relevant test resource 40. Each test resource 40 can thus be considered the epitome or standard of a particular type of denied content, such as pornography, malware, etc. However, a test resource 40 need not include any particular content and need not even be deliverable to the client terminals. A test resource 40 can simply be a URL that is indicated as denied in the policy database 36.

As mentioned, processing the deny decisions includes the policy discovery script 30 outputting any suitable indication of policy existent for the remote client terminal 16 making the test resource request. Examples of outputting such indications include output of a notice at a user interface of the remote client terminal 16 to alert the user to the policy, selective output by the remote client terminal 16 of requested content transmitted by the host that initially provided the reference to the script 30, transmission of such an indication to the host that initially provided the reference to the script 30 so that the host can select content for the client terminal 16 based on the indication. Other examples of outputting such indications are contemplated and within the scope of the invention.

In operation, the policy service 34 denies requests for resources at host 14 that contravene policy by, for example, serving a block/deny page to the requesting client terminal 16 to inform the user that the content is blocked. Resources at the host 14 that are allowed by policy are served to the requesting client terminals 16. The host 12, on the other hand, serves resources that include a reference to the policy discovery script 30. The policy discovery script 30 is obtained from the policy service domain 32 and executed by the requesting client terminal 16 before the bulk of the resource is provided to the user at the client terminal 16. For instance, the resource may be a web page and the reference may be an HTML script tag that causes the client terminal to download and execute the policy discovery script 30 before the body of the web page is displayed. The policy discovery script 30 requests one or more test resources 40 from the policy service domain 32 and monitors for any intervention by the policy service 34, such as redirection to a deny page. The policy discovery script 30 thereby discovers which test resources 40 are denied and thus which content policy factors contribute to the policy being enforced upon the client terminal 16. The policy discovery script 30 can then perform any action at the client terminal 16 based on the discovered policy prior to or while the resource is being provided to the user. Actions can be performed by the client terminal 16 or by the host 12 and include alerting the user to the discovered policy, selective output of the content of the requested resource, substitution of content, and similar.

Figure 2:
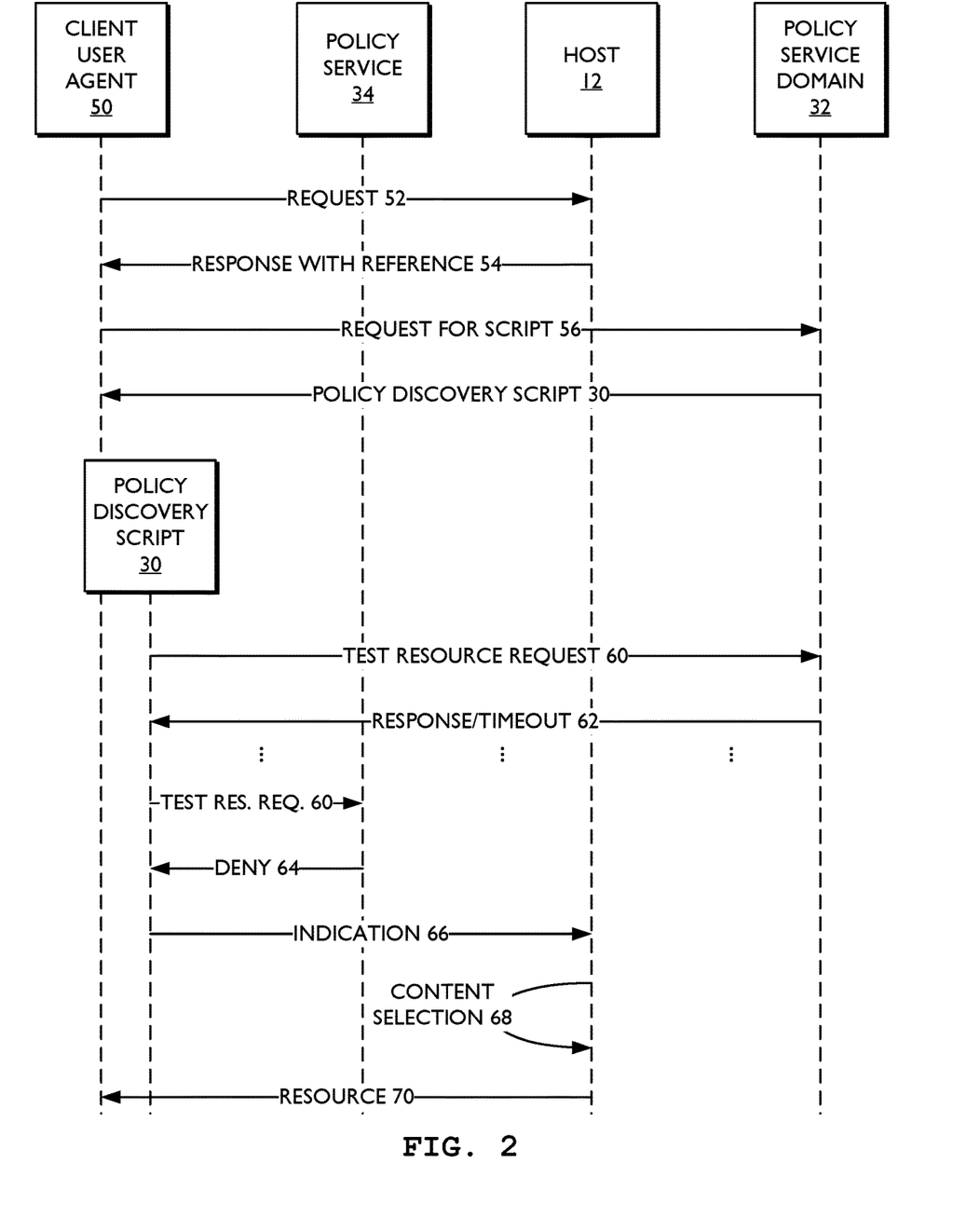
FIG. 2 is a process diagram of content policy discovery and a host selecting content accordingly.

FIG. 2 shows discovery of content policy using the present invention when the host is configured to select content for a resource based on any indications of discovered policy sent by the remote client terminal requesting the resource.

The requesting client terminal 16 makes a request 52 for a resource by, for example, a client user agent 50, transmitting the request 52 to the host 12. The client user agent 50 can be a web browser, media player, media streaming agent, media download agent, or similar program executable on the requesting client terminal 16. In an example where the resource is a web page, the request 52 is made according to a hypertext transfer protocol (HTTP) or HTTP secure (HTTPS) as triggered by the user of the client terminal 16 activating a hyperlink (e.g., clicking, tapping, selecting a bookmark, etc.) specifying the desired web page. If the request 52 contravenes policy enforced by the policy service 34, then the request 52, or a corresponding response from the host 12, is blocked and a deny page may be served to the client terminal 16.

When the request 52 is not blocked, the host 12 receives the request 52 and responds with a response 54 that includes at least a reference to the client-executable policy discovery script 30 hosted at the policy service domain 32. The response 54 may also include other information, such as content.

The client terminal 16 receives the response 54, provided that it is not blocked by the policy service 34, and uses the reference to make a request 56 for the policy discovery script 30 to the policy service domain 32. The host 28 at the policy service domain 32 fulfils this request 56 by sending the policy discovery script 30 to the client terminal 16.

The requests and responses discussed above are made by the client user agent 50 during normal operation. Once the policy discovery script 30 has been downloaded to a degree sufficient to execute, the policy discovery script 30 controls the client user agent 50 to perform subsequent actions described below.

The policy discovery script 30 makes one or more test resource requests 60 to the policy service domain 32. Any number of requests 60 for test resources 40 may be made. The policy service 34, operating normally, executes policy decisions for the requests 60 in accordance with any policy existent at the policy service 34 for the client terminal 16. It is contemplated that each request 60 will request a test resource indicative of a particular content policy factor or combination of factors. For example, a first test request may be a request for a test resource that is blocked due to pornographic content and a particular user group, a second test request may be a request for a test resource that is blocked for illegal content, a third test request may be a request for a test resource that is blocked for malware, and so on.

When a test resource request 60 is not blocked, as shown by policy service domain 32 providing a response 62, then the policy discovery script 30 determines that the client terminal 16 is unaffected by policy applied to the test resource that was the subject of the request 60. The response 62 can be of any form detectable by the policy discovery script 30, such as a short HTML document forming the test resource, an HTTP status code (e.g., HTTP 200—"OK"), or similar. However, the response 62 is not necessary and the policy discovery script 30 can be configured to treat a non-response as an indication that the client terminal 16 is unaffected by such policy. The policy discovery script 30 can determine a non-response based on a timeout commenced upon sending the request 60. Upon elapse of the timeout, the policy discovery script 30 determines that the test resource request 60 is not blocked.

When a test resource request 60, or the expected response, is blocked by the policy service 34, the policy service 34 transmits an indication of a deny decision 64 to the client terminal 16. The indication of a deny decision 64 may take any suitable form, such as a deny page or other human-intelligible message that indicates that the requested resource, in this case a test resource, is denied due to policy existent for the client terminal 16. A deny decision 64 need not be human intelligible and may simply be a machine-intelligible response to the client terminal 16 that the request has been blocked. It is contemplated that some policy services 34 may not provide any response to requests for blocked content, so the timeout methodology discussed above can alternatively be used to detect blocked requests instead of allowed requests.

The client-executable policy discovery script 30 is configured to recognize and process the indication of the deny decision 64. As such, the policy discovery script 30 may be configured to probe the policy service 34 with a spectrum of test resource requests 60 to determine a complete or near complete policy profile for the client terminal 16. Alternatively, the policy discovery script 30 may be configured to make a single test resource request 60 to determine whether a particular content policy factor or set of factors triggers a deny decision. Any number of test resource requests 60 of any configuration may be made.

In this example, the policy discovery script 30 processes one or more indications 66 of one or more deny decisions 64 by transmitting such indications 66 to the host 12. Transmitting the indications 66 to the host 12 can include submitting another request to the host 12, similar to the initial request 52 but with parameters indicative of the one or more deny decisions 64. Parameters may be provided as HTTP GET or POST parameters, within a cookie, or similar. For instance, if the initial request 52 was for the resource:

http://www.example.com/page.rb

Then the indications 66 of deny decisions can be sent to the host by a request with parameters, such as:

http://www.example.com/page.rb?policy=3474 where the code 3472 is an indication 66 of the one or more deny decisions 64.

The host 12 is configured to receive the one or more indications 66, process the indications, and perform content selection 68 for the resource that was the subject of the initial request 52. Receiving the indications can be performed via parameters applied to a subsequent request, as discussed above. Processing the indications can include mapping the parameters to elements of content. Content selection 68 is based on the results of the processing and the host generates a resource containing the selected content. The host 12 then transmits the resource 70 containing the selected content to the remote client terminal 16. It is contemplated that the resource 70 will omit or modify the reference to the policy discovery script 30, so that the above process is not repeated.

The host 12 can be configured to select content that is commensurate with the deny decisions 64 and hence with the relevant policy in force for the client terminal 16. The host 12 may configure versions of the resource 70 compatible with various policies. For example, if the host 12 serves a wide variety of content, the host 12 can replace content that would violate a client terminal's policy with content that would not violate such a policy.

Indications 66 of one or more deny decisions 64 can be stored for future reference so as to reduce the need to send the reference to the script 30 to the client terminal 16 and the need for the client terminal 16 to execute the script 30. Storing the indications 16 can be done by setting a cookie at the client terminal 16, with the host 12 reading the cookie for future requests. Alternatively or additionally, the host 12 can store a session variable for the client terminal 16. A suitable expiry time can be stored to force the client terminal 16 to execute the script 30 again.

In a use-case example, a user requests a web page offered by a host. The user, client terminal, and host are unaware of any policy in effect for the user. The host responds to the request with a web page that includes little or no content but that includes a reference to the policy discovery script. The web page is not denied by the policy service. The host has provided parameters to the script to discover whether the client has policy in effect for content related to pornography and gambling. The script is executed by the client terminal which causes the client terminal makes test requests to the policy service domain. The script receives a deny decision for pornography but no deny decision for gambling. The script sends an indication of the deny decision for pornography to the host, which adjusts the content of the requested web page to remove any content tagged as pornography and replace such content with content not tagged as pornography. The host then transmits the adjusted web page to the client terminal for output to the user.

Figure 3:
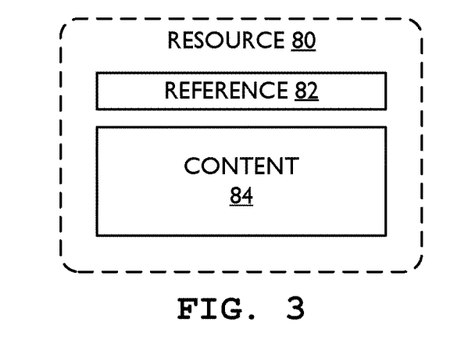
FIG. 3 is a diagram of a resource containing a reference to a policy discovery script.

FIG. 3 shows a resource 80 that can be sent by a host to a client terminal. The resource includes a reference 82 to the policy discovery script 30 and may also include content 84. The resource 80 is an example of what can be sent by the host to the client terminal as the response 54 to an initial request 52 (FIG. 2). The reference 82 can be the HTML script reference discussed above or similar.

Figure 4:
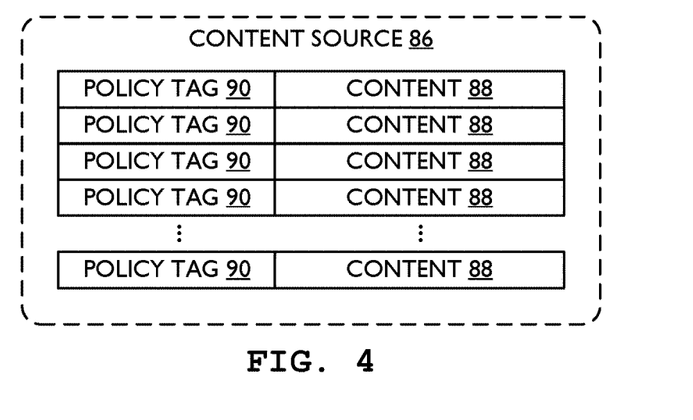
FIG. 4 is a diagram of content associated with policy tags.

FIG. 4 shows a content source 86 such as a content management system, database, template system, dynamic content system, or similar. The content source 86 is controlled by a host and can output content for resources to be sent by the host to client terminals. The content source 86 includes elements of content 88, such as text, portions of web pages, complete web pages, images, video files/streams, sound or music files/streams, references to such elements, and similar. Each element of content 88 is associated with one or more policy tags 90 that identify content policy that applies the element of content 88. That is, a policy tag 90 indicates a content policy that the element of content 88 is expected to contravene. For example, a section of a web page may be an element of content stored in associated with a policy tag 90 identifying the content of the section of the web page as gambling related. The host is then able to avoid sending the section of the web page to a client terminal that identifies itself as being under policy that blocks gambling content.

Figure 5:
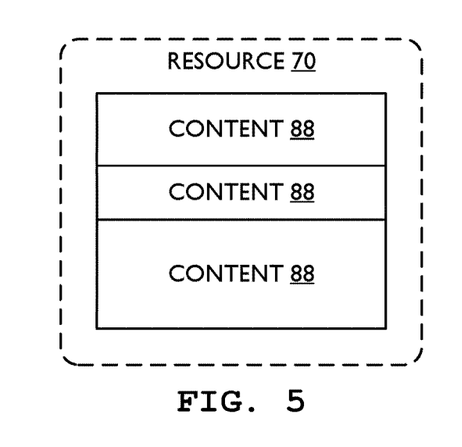
FIG. 5 is a diagram of a resource containing selected content.

FIG. 5 shows an example of a resource 70 (FIG. 2) sent by a host to a client terminal in response to one or more indications 66 of a deny decision. The host can select elements of content 88 for the resource 70 from the content source 86 (FIG. 2) based on the one or more indications 66. Elements of content 88 having policy tags 90 that match the one or more indications 66 of a deny decision can be omitted from the resource 70 to as to abide by content policy in effect for the client terminal. For example, indications 66 may reflect a deny decision affecting a client terminal for content that is related to gambling. The host can then not insert elements of content 88 having policy tags 90 indicating gambling when building resources 70 to send to the client terminal. Other elements of content 88, which do not have policy tags 90 indicating gambling, can be provided instead.

Elements of content 88 are not particularly limited. The resource 70 can be a redirect in which the element of content 88 is a reference to another web page. In such example, the initial resource 80 sent by the host may only include the reference 82 to the policy discovery script 30, with the expectation that the initial request by the client terminal will be redirected to a resource appropriate to the policy discovered for the client terminal. The elements of content 88 in the content source 86 are references to different web pages for redirection based on the policy tags 90. This can facilitate redirection to different pages of a web site based on content policy, if any, discovered for a client terminal.

Figure 6:
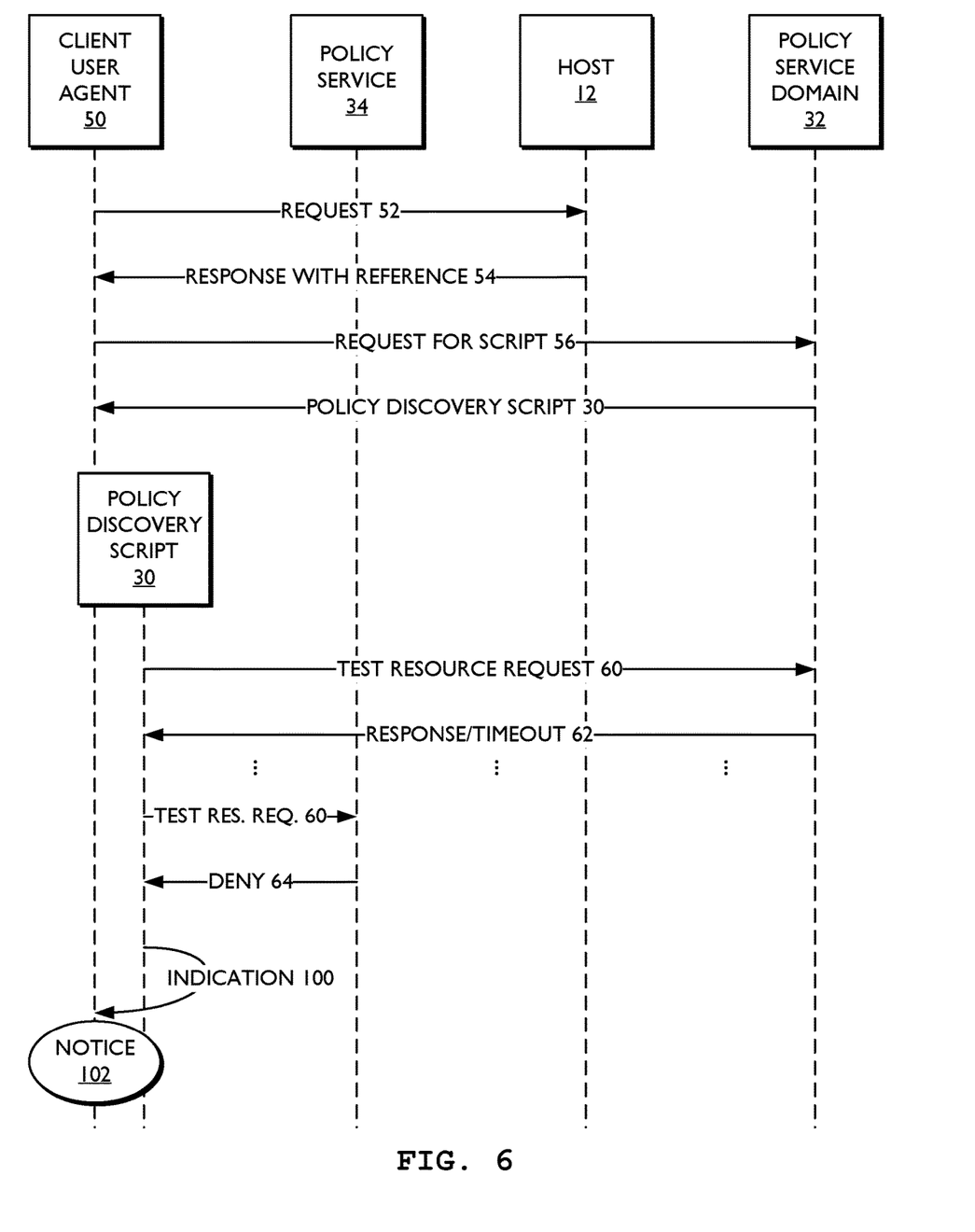
FIG. 6 is a process diagram of content policy discovery and a remote client terminal issuing a notice of discovered policy.

FIG. 6 shows discovery of content policy using the present invention when the client terminal is configured to notify the user of discovered content policy. The process of FIG. 6 is similar to that of FIG. 2 and only differences will be discussed in detail. The related description of FIG. 2 can be referenced, with like numerals indicating like components.

The policy discovery script 30 receives a deny decision 64 and outputs an indication 100 of the deny decision through the user agent 50 on the client terminal 16 as a notice 102 at a user interface of the client terminal 16. This can be achieved by the policy discovery script 30 triggering a notice native to the user agent 50, such as a JavaScript pop-up dialog box or similar. Additionally or alternatively, the policy discovery script 30 issues a notice by writing/modifying content at the user agent 50 by referencing the document object model (DOM) or similar data structure maintained by the user agent 50. The content of the notice 102 can be a human-intelligible message indicating content policy that has been discovered to be in effect.

Figure 7:
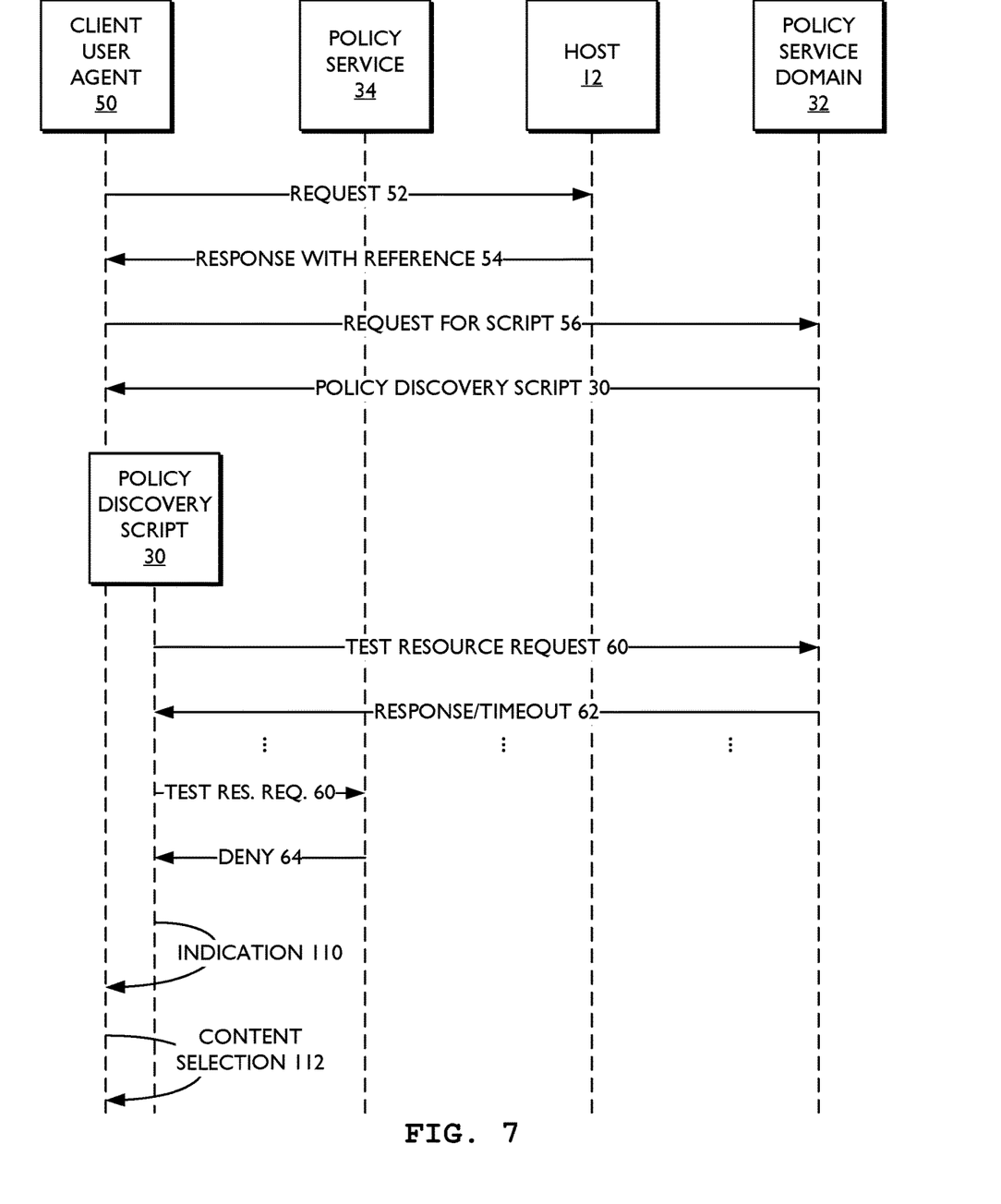
FIG. 7 is a process diagram of content policy discovery and a remote client terminal selecting content accordingly.

FIG. 7 shows discovery of content policy using the present invention when the client terminal is configured to selectively output content based on discovered content policy. The process of FIG. 7 is similar to that of FIG. 2 and only differences will be discussed in detail. The related description of FIG. 2 can be referenced, with like numerals indicating like components.

The policy discovery script 30 receives a deny decision 64 and outputs an indication 110 of the deny decision to the user agent 50 as one or more commands to write, modify, or hide content at the user agent 50 by referencing the DOM. That is, the policy discovery script 30 can be configured to respond to indications 110 of deny decisions by performing content selection 112 to selectively present the content of a resource, such as a resource initially sent with response 54 and containing the reference to the policy discovery script 30. As such, content can be selectively presented at the client terminal without further communications with the host.

In the processes of FIGS. 6 and 7, the policy discovery script 30 can be configured to store indications 100, 110 of one or more deny decisions 64 for future reference so as to reduce the need to execute the script 30 at each request. Storing the indications can be done by the script 30 setting local variables at the client terminal 30. A suitable expiry time can be stored to force the client terminal 16 to execute the script 30 again.

Figure 8:
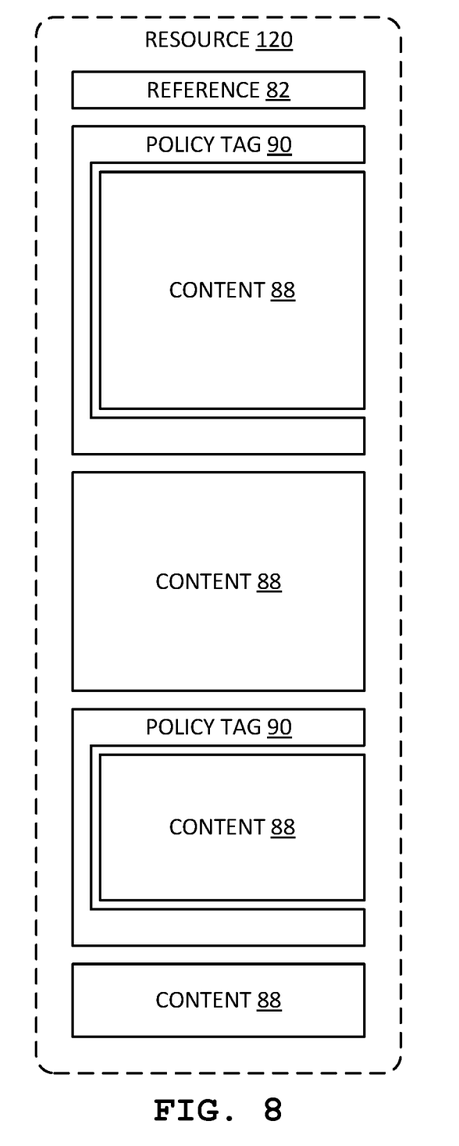
FIG. 8 is a diagram of a resource containing selectable content.

FIG. 8 shows a resource 120 that can be sent by a host to a client terminal. The resource includes a reference 82 to the policy discovery script 30 and may also include elements of content 88 demarcated by policy tags 90. For instance, in HTML, a policy tag 90 can include a tag pair of a class that indicates the relevant policy and that brackets an element of content 88 as follows:

```
<div class="policy_gambling">
[ANY CONTENT AND/OR OTHER HTML TAGS]
</div>
```

The resource 120 is an example of what can be sent by the host to the client terminal as the response 54 to an initial request 52 (FIG. 2). The resource 120 is readily modifiable by the policy discovery script 30 via the DOM to hide or show elements of content 88 based on comparison of the respective policy tags 90 to indications 110 of any deny decisions. In the HTML DIV element example above, the policy discovery script 30 can be configured to get elements by class name (e.g., the JavaScript getElementsByClassName( ) method) and perform content selection 112 by adjusting visibility or display properties of such elements.

The policy discovery script 30 can be configurable by the host. This can instruct the script 30 as to the nature of the policy to be discovered at the client terminal. For example, the policy discovery script 30 can be configured to discover whether or not content policy is in effect for a particular factor, such as gambling or malware, that is specified to the script 30 by the host setting a parameter or variable or by selecting a particular version of script (e.g., a different script to test for each content policy). Hence, a particular host can be configured to help remote client terminals discover particular types of policy, which may be relevant to the content served by the host. The indications of policy denials can then be true/false values for each existent content policy. The configuration of the script by the host is then analogous to the question: is the remote client subject to content policy for gambling? The answer to the host from the client after policy discovery can be a Boolean response such as: policy for gambling=true.

Additionally or alternatively, the policy discovery script 30 can be configurable by the host to return to the host a list of all discovered content policies for the client terminal. The host 12 can be configured to configure the policy discovery script 30 to specify policies to test based on the content requested by a client terminal. That is, if the requested content is associated with a particular policy tag 90, then the host 12 configures the script 30 to test for the related content policy or policies. Further, if the requested content is not associated with a particular policy tag 90, then the host 12 configures the script 30 to not test for the related content policy or policies.

The present invention includes various applications of the above techniques and these applications will now be discussed.

Figure 9:
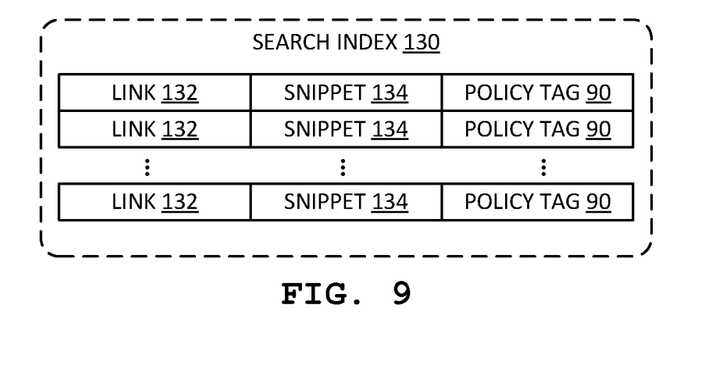
FIG. 9 is a diagram of a search index having policy tags.
Figure 10:
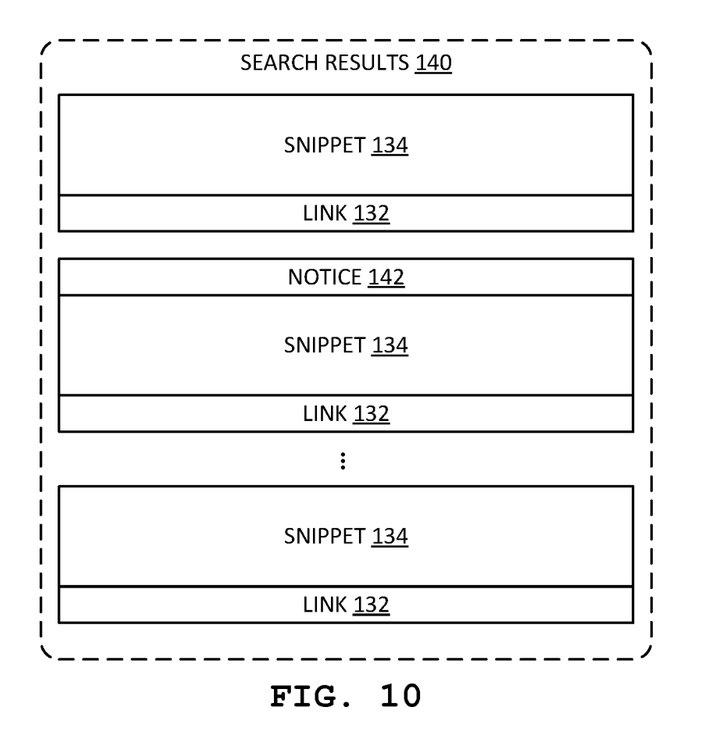
FIG. 10 is a diagram of a search results list.

With reference to FIG. 1, host 12 can implement a search engine. Content indexed by the search engine can be associated with policy tags that are compared to indications of policy denials. As shown in FIG. 9, a search index 130 includes links 132 to indexed content, such as web pages, snippets 134 or previews of indexed content, and policy tags 90 associated with the links 132. When the host is preparing a search results page to send as a resource 70 (FIG. 2) to a client terminal, the host can refrain from including in the results page any links 132 and snippets 134 associated with policy tags 90 that match the indications 66 of and policy denials received from the client terminal. Advantageously, the user at the client terminal only sees links and snippets to content that conforms to policy and therefore cannot activate a link to a resource that would then be immediately denied by the policy service 34. Alternatively, as shown by example search results 140 of FIG. 10, the host can display human-intelligible notices 142 for links 132 and snippets 134 associated with policy tags 90 that match the indications 66, so that policy-contravening links 132 and snippets 134 are still shown but the user is warned that the linked content will likely be blocked. Further, the search engine according to the present invention is capable of complying with numerous different content policies without user intervention, which is a more convenient and complete solution than that offered by conventional search engines that allow users to affirm that one type of content (i.e., pornography) that is not to be shown in results.

With reference to FIG. 1, host 12 can implement a media server that serves video files/streams, music files/streams, or similar. The host 12 can be configured to refrain from offering to a client terminal media that violates that terminal's content policy. For example, if it is determined that the client terminal's content policy restricts adult content, then the host 12 can refrain from showing any indications of adult media (e.g., movies rated R), such as thumbnails, descriptions, links, and the like. The host 12 can dynamically reconfigure listings of available media based on such policy.

In another example, a content policy restricts access to unlicensed content, such as grey-market content, pirated content, content that has been modified without permission of the owner, and similar. The host 12 may offer such unlicensed content in addition to licensed content. For example, a video sharing web site may host licensed content, content whose licensing status is undetermined or unclear, content whose licensing status varies by jurisdiction (e.g., public domain in one jurisdiction, but subject to copyright in another), and content that is clearly unlicensed. The host 12 can then discover the content policy of each client terminal that requests content and can comply with such content policy. That is, for content policy that does not restrict access to unlicensed content, the host 12 can deliver the requested content, irrespective of licensing status. On the other hand, for content policy that does restrict access to unlicensed content, the host 12 can deliver alternate content in response to requests for unlicensed content. Alternate content can include, for example, licensed content, previews of licenced content that is for sale, links to licensed content, and similar. Alternate content can be selected by the host 12 to correspond to the requested unlicensed content. For example, if a client terminal 16 requests to view a pirated stream of a movie and the host 12 detects that the client terminal has content policy that restricts access to unlicensed content, then the host 12 can instead deliver or redirect to a preview of a licensed stream of the movie with a link that enables purchase of a license to view the movie.

With reference to FIG. 1, host 12 can implement a large site with varied content from various sources, such as a blog host, micro-blog site, social media site, news/entertainment site, and similar. Using the techniques discussed above, the host 12 can tailor the content that it delivers to any content policy at the remote client terminals. Each terminal thus has the potential to see different aspects of the site without requiring the entire site to be blocked by the policy service just because of one aspect that may contravene policy. For example, a large site may provide a school-friendly version that is selected when content policy congruent with a school environment is discovered.

Figure 11:
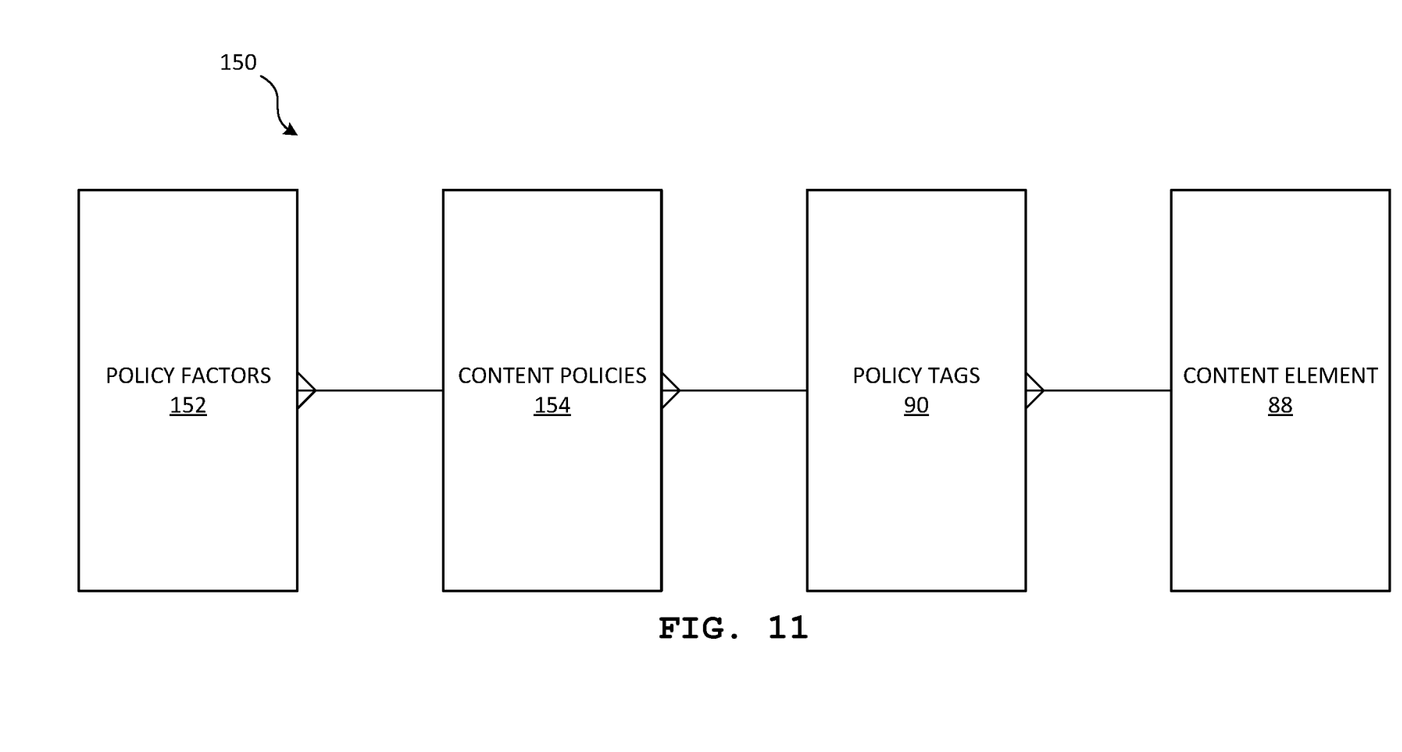
FIG. 11 is a diagram of a mapping of policy factors, content policies, policy tags, and content elements.

FIG. 11 shows a mapping 150 that links the content policy factors discussed above to content elements 88 that selectively form part of resources sent to client terminals. Policy factors 152 can be used to set content policies 154 for the client terminals. A particular client terminal's content policy 154 references one or many policy factors 152. For example, a first client terminal may be blocked for pornography, while a second client terminal may be blocked for gambling and malware. Each policy tag 90 for demarking elements of content 88 can map to one or many content policies 154. This enables a host to set coarse policy tags 90 that remove unsuitable content without requiring the host to address each possible content policy 154. To allow for fine-grained control when desired, each element of content 88 can be controlled by one or more policy tags 90.

The mapping of policy factors 152 to content polices 154 can be managed at the policy service 34. The mapping of content policies 154 to policy tags 90 can be managed by the policy discovery script 30 and can be configurable. That is, the policy discovery script 30 is aware of the content policies 154 possible at the policy service 34 and references the mapping of content policies 154 to policy tags 90 to translate policy denials into indications of such denials for the host in the form of policy tags 90. The mapping of policy tags 90 to elements of content 88 is controlled by the host and resides within a content source 56 or resources 120.

Advantages of the present invention include the ability to discover policy without any special action needed by or modification to the policy service and the client terminals. Hosts can configure content to comply with policy rather than have entire sites blocked. A client terminal can process content to present content in a manner that is congruent with policy. Users can advantageously be made aware of content policy before requesting access to restricted content. Links to content can be made more reliable, in that links to blocked content can be omitted so that the link cannot be followed just to have the linked content immediately blocked. In view of this, the quantity of policy decisions the need to be processed can be reduced and communication of requests for content that will go unfulfilled can also be reduced.

While the foregoing provides certain non-limiting example embodiments, it should be understood that combinations, subsets, and variations of the foregoing are contemplated. The monopoly sought is defined by the claims.

What is claimed is:

1. A process for discovering content policy applicable to client terminals, the process comprising:
   receiving from a remote client terminal a request for a resource controlled by a host, the resource made available by the host to remote client terminals via a wide-area network;
   the host providing a reference to a policy discovery script as part of a response to the remote client terminal, the policy discovery script being hosted at a policy service domain and accessible via the wide-area network;
   the policy service domain providing the policy discovery script to the remote client terminal in response to a request from the remote client terminal for the policy discovery script, the request using the reference to the policy discovery script;
   the policy discovery script executable by the remote client terminal to control the remote client terminal to make a test resource request to the policy service domain;
   the policy service domain executing a policy decision for the test resource request in accordance with any policy existent at the policy service for the remote client terminal;
   the policy service domain transmitting an indication of a deny decision to the remote client terminal; and
   the policy discovery script processing the indication of the deny decision to output an indication of policy existent for the remote client terminal.

2. The process of claim 1, wherein processing the indication of the deny decision to output the indication of policy existent for the remote client terminal comprises outputting a notice at a user interface of the remote client terminal.

3. The process of claim 1, wherein processing the indication of the deny decision to output the indication of policy existent for the remote client terminal comprises outputting content of the resource as selected by policy discovery script according to the indication.

4. The process of claim 1, wherein processing the indication of the deny decision to output the indication of policy existent for the remote client terminal comprises transmitting the indication to the host via the wide-area network.

5. The process of claim 4, further comprising the host selecting content for the resource based on the indication of policy existent for the remote client terminal and transmitting selected content to the remote client terminal.

6. A system for allowing discovery of content policy applicable to client terminals, the system comprising:
   a plurality of hosts, each host making resources available to remote client terminals via a wide-area network, each host configured to provide responses to requests for resources, at least one response including a reference to a policy discovery script;
   a policy service domain to provide the policy discovery script to a remote client terminal in response to a request from the remote client terminal for the policy discovery script, the request using the reference to the policy discovery script;
   a policy service in the policy service domain, the policy service configured to execute policy decisions for requests for resources made by remote client terminals in accordance with any policy existent at the policy service for the remote client terminals; and
   the policy discovery script hosted in the policy service domain and accessible via the wide-area network, the policy discovery script executable by the remote client terminal to control the remote client terminal to make a test resource request to the policy service domain, the policy discovery script configured to process a deny decision made for the test resource request to output an indication of policy existent for the remote client terminal.

7. The system of claim 6, wherein the policy discovery script is configured to process the deny decision to output the indication of policy existent for the remote client terminal by outputting a notice at a user interface of the remote client terminal.

8. The system of claim 6, wherein the policy discovery script is configured to process the deny decision to output the indication of policy existent for the remote client terminal by selectively outputting content of a resource according to the indication.

9. The system of claim 6, wherein the policy discovery script is configured to process the deny decision to output the indication of policy existent for the remote client terminal by transmitting the indication to a host that provided the reference to the policy discovery script.

10. The system of claim 9, wherein the host is configured to select content for a resource based on the indication of policy existent for the remote client terminal and to transmit selected content of the resource to the remote client terminal.

11. A process for indicating discovered content policy applicable to client terminals, the process comprising:
    hosting a policy discovery script;
    providing the policy discovery script to a remote client terminal in response to a request using a reference to the policy discover script, the request using a reference to the policy discovery script;
    executing policy decisions for requests for resources made by remote client terminals in accordance with any policy existent for the remote client terminals;
    transmitting indications of deny decisions to the remote client terminals; and
    receiving a test resource request from the remote client terminal, the test resource request made by the policy discovery script executed by the remote client terminal, the policy discovery script referred to the remote client terminal by a host as part of a response to a request for a resource made by the remote client terminal to the host via a wide-area network, the test resource request configured to trigger a deny decision.

12. A system for indicating discovered content policy applicable to client terminals, the system comprising:
    a policy service domain to provide a policy discovery script to a remote client terminal in response to a request from the remote client terminal for the policy discovery script, the request using a reference to the policy discovery script;

a policy service in the policy service domain, the policy service configured to execute policy decisions on requests for resources available on a wide-area network, the requests made by remote client terminals in accordance with any policy existent for the remote client terminals; and a policy discovery script hosted at the policy service domain and accessible via the wide-area network, the policy discovery script executable by the remote client terminal to control the remote client terminal to make a test resource request to the policy service domain, the policy discovery script configured to process a deny decision made for the test resource request to output an indication of policy existent for the remote client terminal.

13. The system of claim 12, wherein the policy discovery script is configured to process the deny decision to output the indication of policy existent for the remote client terminal by outputting a notice at a user interface of the remote client terminal.

14. The system of claim 12, wherein the policy discovery script is configured to process the deny decision to output the indication of policy existent for the remote client terminal by selectively outputting content of a resource according to the indication.

15. The system of claim 12, wherein the policy discovery script is configured to process the deny decision to output the indication of policy existent for the remote client terminal by transmitting the indication to a host that provided the remote client terminal with a reference to the policy discovery script.

16. A system for discovering content policy applicable to client terminals, the system comprising:

a host connected to a wide-area network;

a policy service domain to provide a policy discovery script to a remote client terminal in response to a request from the remote client terminal for the policy discovery script, the request using a reference to the policy discovery script; and a policy discovery script at the host and accessible via the wide-area network, the policy discovery script executeable by the remote client terminal to control the remote client terminal to make a test resource request to a policy service domain, the policy discovery script configured to process a deny decision made for the test resource request by a policy service of the policy service domain so as to output an indication of policy existent for the remote client terminal.

* * * * *